US007779815B2

(12) United States Patent
Ricco et al.

(10) Patent No.: US 7,779,815 B2
(45) Date of Patent: Aug. 24, 2010

(54) FUEL INJECTION SYSTEM COMPRISING A VARIABLE FLOW RATE HIGH-PRESSURE PUMP

(75) Inventors: Mario Ricco, Casamassima (IT); Sergio Stucchi, Valenzano (IT); Onofrio De Michele, Valenzano (IT); Mariagrazia Lisbona, Valenzano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 12/022,078

(22) Filed: Jan. 29, 2008

(65) Prior Publication Data

US 2009/0064971 A1 Mar. 12, 2009

(30) Foreign Application Priority Data

Sep. 11, 2007 (EP) .................................. 07425557

(51) Int. Cl.
*F02M 57/02* (2006.01)
*F02M 69/54* (2006.01)
*G06F 17/00* (2006.01)

(52) U.S. Cl. ......................... 123/446; 123/457; 701/103

(58) Field of Classification Search ................. 123/446, 123/457; 701/103
See application file for complete search history.

(56) References Cited

U.S. PATENT DOCUMENTS

| | | | | |
|---|---|---|---|---|
| 6,257,204 | B1 * | 7/2001 | Kamijo et al. | 123/456 |
| 6,367,452 | B1 * | 4/2002 | Shima et al. | 123/457 |
| 6,422,203 | B1 * | 7/2002 | Djordjevic | 123/456 |
| 6,505,608 | B2 * | 1/2003 | Hiraku et al. | 123/458 |
| 6,976,473 | B2 * | 12/2005 | Boos et al. | 123/446 |
| 7,124,740 | B2 * | 10/2006 | Nomura et al. | 123/458 |
| 7,182,067 | B2 * | 2/2007 | Ricco et al. | 123/446 |
| 7,228,844 | B2 * | 6/2007 | Ricco et al. | 123/446 |
| 7,263,972 | B2 * | 9/2007 | Tokuda et al. | 123/431 |
| 7,299,790 | B2 * | 11/2007 | Okamoto et al. | 123/506 |
| 7,320,312 | B2 * | 1/2008 | Takahashi | 123/446 |
| 7,395,812 | B2 * | 7/2008 | Ricco et al. | 123/446 |
| 7,444,988 | B2 * | 11/2008 | Ricco et al. | 123/446 |
| 2009/0050110 | A1 * | 2/2009 | Ricco et al. | 123/447 |

FOREIGN PATENT DOCUMENTS

| | | | |
|---|---|---|---|
| EP | 1357285 | A2 | 10/2003 |
| EP | 1674716 | A1 | 6/2006 |
| EP | 1741912 | A2 | 1/2007 |

* cited by examiner

*Primary Examiner*—Stephen K Cronin
*Assistant Examiner*—David Hamaoui
(74) *Attorney, Agent, or Firm*—Seed IP Law Group PLLC

(57) ABSTRACT

An injection system includes a high-pressure pump with at least one pumping element operated in a reciprocating manner by corresponding intake and discharge strokes. Each pumping element is equipped with a corresponding intake valve in communication with an intake line, fed by a low-pressure pump. An on-off solenoid valve is positioned on the intake line of the pump and is controlled by a control unit with a frequency equal to a whole multiple or submultiple of that of the pumping action, multiplied by a factor different from 1 and/or between 0.90 and 1.10, inclusive.

14 Claims, 3 Drawing Sheets

FUEL INJECTION SYSTEM COMPRISING A VARIABLE FLOW RATE HIGH-PRESSURE PUMP

The present invention concerns a fuel injection system for an internal combustion engine comprising a variable flow rate high-pressure pump.

BACKGROUND OF THE INVENTION

As it is known, in modern internal combustion engines, the high-pressure pump of the injection system is able to send fuel to a common rail having a predetermined accumulation volume of pressurized fuel, which feeds a plurality of injectors associated with the engine's cylinders. In general, the required pressure of the fuel in the accumulation volume for this type of system is defined by an electronic control unit, based on the engine's operating conditions.

Injection systems are known, in which a bypass solenoid valve, positioned on the pump's delivery line, is controlled by the control unit. When the engine runs at maximum speed but with reduced power, the flow rate of pump is excessive and the excess fuel is simply discharged by the bypass valve directly into the fuel tank. This bypass valve thus has the problem of dissipating part of the compression work of the high-pressure pump as heat.

Injection systems have been proposed in which the high-pressure pump has variable flow rate, so as to reduce the quantity of pumped fuel when the engine operates with reduced power. In one of these systems, the pump's intake line is fitted with a throttle solenoid valve for a restriction, which is controlled asynchronously by the control unit with respect to the operation of the pumping element, as a function of the pressure required in the common rail and/or the engine's operating conditions. The fuel taken in, downstream of the throttle solenoid valve and the restriction, has a very low pressure and, at low flow rates, makes little contribution to the force for opening the intake valves.

To this end, in known systems it is necessary to provide the usual return spring for each intake valve so as to guarantee opening even with minimal pressure downstream of the restriction. On one hand, this spring must be set in a very precise manner, whereby the pump becomes relatively expensive. On the other hand, the risk always remains that the intake valve is not able to open itself under the combined effect of the pressure exerted by the fuel on the intake valve and the depression caused by the pumping element in the relevant compression chamber, whereby the pump does not work properly and is easily subject to wear. In any case, if the pump has multiple pumping elements, it always gives rise to asymmetric delivery, especially under conditions of strong delivery choking.

In another known injection system, a throttle device has been proposed that comprises an on-off metering solenoid valve, which can be positioned on the intake line of the individual pumping element, or on an intake line common to the pumping elements. The metering solenoid valve has relatively high flow rate, so as to allow feeding the pumping element during a variable part of the intake stroke, of which the instant of the start and/or end of feeding is modulated, thereby the filling coefficient of the pumping elements is modulated.

If the control and actuation of this solenoid valve takes place synchronously with respect to the pump shaft's frequency of rotation (i.e. the metering solenoid valve is activated every revolution of the shaft, independently of the number of pumping elements that distinguish it), this throttle device has the drawback of having to synchronize and to time the operation of the metering solenoid valve with the position of the piston in each pumping element during the associated intake stroke. The same drawback is found if the activation frequency of the metering solenoid valve has a value equal to or a multiple of the intake stroke frequency of any pumping element (in particular, if the metering solenoid valve is synchronized with the intake stroke of the pumping elements; for example, for a pump with three pumping elements driven by a cam, its activation frequency is equal to three times the frequency with which the pump completes a revolution).

These systems, with flow regulated via an on-off metering solenoid valve on the intake line and controlled in a synchronous manner with respect to the rotational frequency of the pump and, in particular, systems in which the metering solenoid valve is controlled in a synchronous manner during the intake stroke of the pumping elements or with a multiple frequency of these strokes, present several other drawbacks that cause pressure oscillations in the common rail. First of all, it is necessary to distinguish between the causes that induce pressure oscillations over a relatively short time span, in the order of one engine cycle, and causes that induce pressure oscillations in the common rail over a time span in two or three orders of magnitude longer than the previous one. These two types of causes are additive and are substantially independent of each other.

Amongst the causes inducing pressure oscillations with a period equal to that of an engine cycle, the following should be mentioned:

- irregular instantaneous flow rate of the high-pressure pump;
- asymmetries in the volume of fuel delivered by the various pumping elements due to unequal setting of the intake springs;
- injection events of the injectors and their timing with respect to the pump's delivery curve;
- volume of the common rail; and
- operating point of the engine.

With regard to pressure oscillations with a period two to three orders of magnitude longer, the main cause is due to the small, or slow, timing variation, or slippage, of the instant of activation start of the metering solenoid valve, with respect to top dead centre of the reference pumping element.

In any case, the filling coefficient of the pumping elements mainly depends on the inevitable delay in the opening of the intake valve and is different from pumping element to pumping element as a result of the impossibility of evenly setting the intake valve springs, whereby the pumping elements work in a mutually asymmetric manner on each engine cycle.

Furthermore, especially in cases where flow choking is more extreme, the filling coefficient of a given pumping element is strongly influenced:

- by the timing of the instant of activation or opening start, of the metering solenoid valve, with respect to the top dead centre of the same pumping element, and therefore by the depression downstream of the metering solenoid valve;
- by the passage section of the metering solenoid valve;
- by the interaction of activation of the metering solenoid valve with possible other pumping elements, the intake valve of which is open at the same time as that of the pumping element being considered;
- by the volume included between the outlet of the metering solenoid valve and the intake valves of the pumping elements,
- by the discharge head of the low-pressure pump; and/or by the pressure regulated by a possible pressure regulator positioned in parallel with the metering solenoid valve.

With regard to the timing of the metering solenoid valve command with respect to the top dead centre of a given pumping element, fixing the duration of activation of the metering solenoid valve, the filling coefficient of the pumping element considered shall assume a larger value in the case where the opening of the solenoid valve takes place when the pumping element is at bottom dead centre, which corresponds to maximum depression being "seen" by the same solenoid valve. In this case, the instantaneous flow of fuel supplied by the metering solenoid valve shall be the maximum, as it is proportional to the pressure difference between the inlet and outlet of the same solenoid valve, whereby the volume of fuel introduced shall be the maximum.

On the contrary, in the case of a pump with multiple pumping elements, the filling coefficient shall be a minimum if, at the moment the metering solenoid valve opens, all of the intake valves are closed (for example, also due to incorrect setting of the respective springs), whereby there will be no depression to aid the flow rate through the metering solenoid valve. The overall, or global, filling coefficient of the pump is a maximum if one or more of the intake valves of the other pumping elements are simultaneously open when the above-described conditions occur, whereby the depression "seen" in output from the metering valve is the maximum.

Since the control unit receives synchronization or timing signals from a phonic wheel carried by the engine drive shaft to generate the digital synchronization signals, these always have errors, albeit minimal, with respect to those supplied by the physical position of the engine drive shaft. This synchronization error can also derive from rounding errors in the pump cycle division calculation, especially in the case of a number of pumping elements that generate a periodic number as a quotient.

In these cases, the error generates slow slippage or scrolling, forwards or backwards, of the signals of the control unit with respect to the pump cycles. Therefore, whatever timing and synchronization is chosen for activating the metering solenoid valve during the delivery of the pumping elements, after a while, these deliveries will have faulty timing, generating ample pressure oscillations in the common rail having a relatively long period.

In particular, the more accurate the reading taken with the phonic wheel and the more precise the algorithm for calculating the frequency of operating the metering solenoid valve itself, the slower will be this slippage of the control signal for activating the metering solenoid valve with respect to the top dead centre of the respective pumping element taken as reference, and consequently, the longer will be the period of induced pressure oscillation.

SUMMARY OF THE INVENTION

The object of the invention is that of embodying a fuel injection system comprising a high-pressure pump, the intake of which is regulated in a manner to eliminate the drawbacks of known art.

According to the invention, this object is achieved by a fuel injection system for an internal combustion engine, comprising a variable flow rate high-pressure pump, as defined in the attached claims.

BRIEF DESCRIPTION OF THE DRAWINGS

For a better understanding of the invention, a preferred embodiment shall now be described, provided by way of example and with the aid of the enclosed drawings, where.

DETAILED DESCRIPTION OF THE INVENTION

Figure 1:
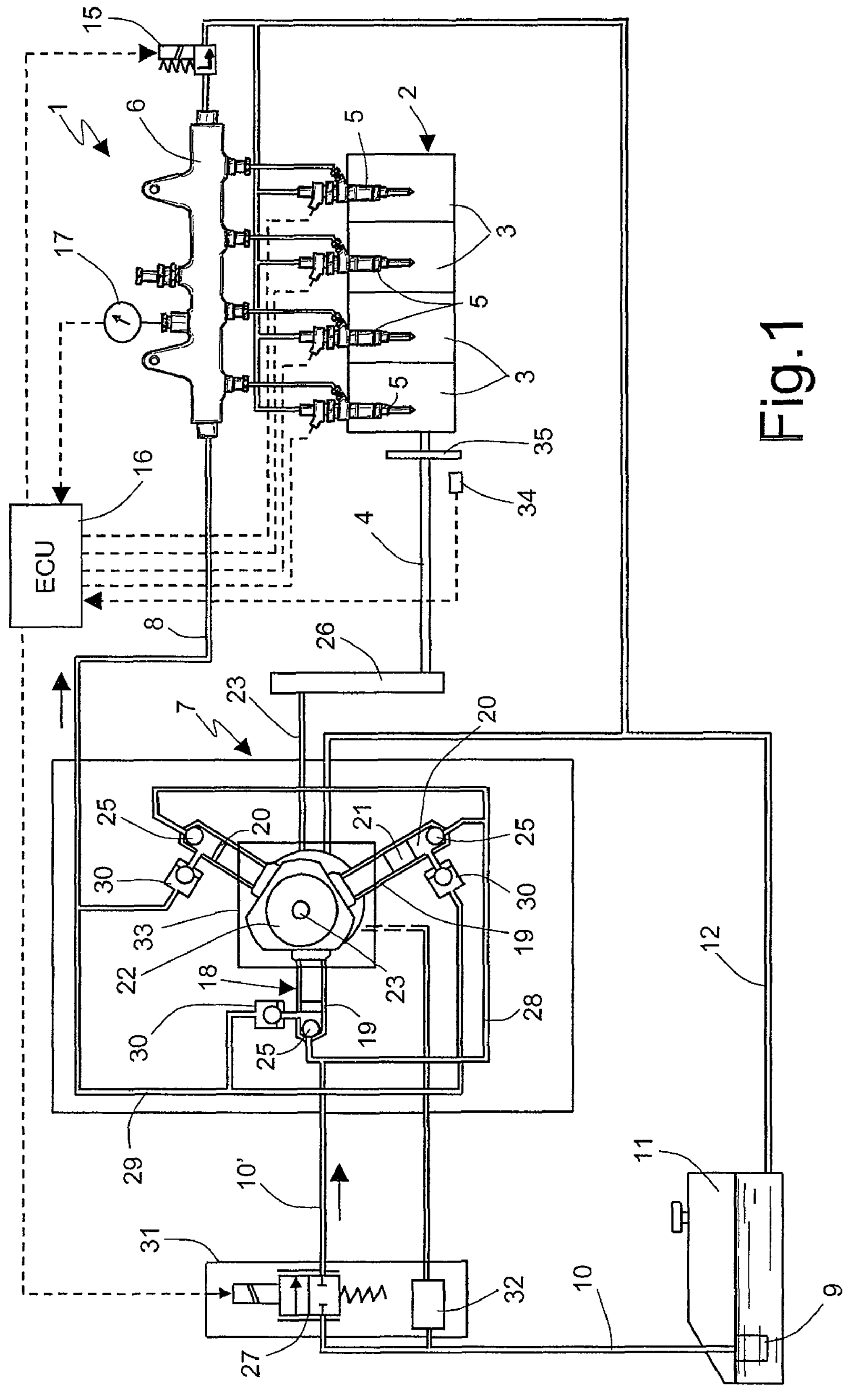
FIG. 1 is a diagram of a fuel injection system, with a first type of high-pressure pump.

With reference to FIG. 1, reference numeral 1 generically indicates a fuel injection system for an internal combustion engine 2, for example with a four-stroke diesel cycle. The engine 2 comprises a plurality of cylinders 3, for example four cylinders, which work together with the corresponding pistons (not shown) and can be operated to turn an engine drive shaft 4. The injection system 1 comprises a plurality of electrically controlled injectors 5, associated with the cylinders 3 and able to inject high-pressure fuel into them. The injectors 5 are connected to an accumulation volume of pressurized fuel, formed by the usual common rail 6, to which all of the injectors 5 are connected.

The common rail 6 is fed with high-pressure fuel by a high-pressure pump, generically indicated by the reference numeral 7, through a delivery line 8. In turn, the high-pressure pump 7 is fed by a low-pressure pump, for example a motor-driven pump 9, through an intake line 10 of the pump 7. The motor-driven pump 9 is normally located in the usual fuel tank 11, into which a discharge line 12 discharges the excess fuel from the injection system 1. The common rail 6 is also equipped with a discharge solenoid valve 15 in communication with the discharge line 12. Each injector 5 is able to inject a quantity of fuel, variable between a minimum value and a maximum value, into the corresponding cylinder 3 under the control of an electronic control unit 16, which can be constituted by the usual microprocessor control unit of the engine 2.

The control unit 16 is able to receive signals indicating the operating conditions of the engine 2, such as the position of the accelerator pedal and the number of revolutions of the engine drive shaft 4, which signals are generated by corresponding sensors (not shown), as well as the pressure of the fuel in the common rail 6, detected by a pressure sensor 17. In particular, the number of revolutions of the engine drive shaft 4 is detected by a sensor 34, of known type, able to sense the angular position of a phonic wheel 35 fitted on the engine drive shaft 4.

The control unit 16, processing the received signals with a special program, controls the instant and duration of activation of the individual injectors 5. In addition, the control unit 16 controls the opening and closing of the discharge solenoid valve 15. Thus, the discharge line 12 conveys to the fuel tank 11 the discharge fuel from the injectors 5 and any excess fuel in the common rail 6, discharged by the solenoid valve 15, as well as the cooling and lubricating fuel originating from the usual sump 33 of the pump 7.

According to the embodiment in FIG. 1, the high-pressure pump 7 is of the radial type, and comprises three pumping elements 18, each formed by a cylinder 19 having a compression chamber 20, in which a mobile piston 21 slides with a reciprocating movement formed by an intake stroke and a compression stroke. Each compression chamber 20 is equipped with a corresponding intake valve 25 and a corresponding delivery valve 30. The valves 25 and 30 can be of the ball type and fitted with respective return springs. The three intake valves 25 are in communication with each other through an internal line 28, in turn in communication with the common intake line 10. The three delivery valves 30 are in communication with each other through another internal line 29, in turn in communication with the common delivery line 8.

In particular, the three pumping elements 18 are arranged radially at 120° to each other and the pistons 21 are driven by a cam 22 carried on a drive shaft 23 of the pump 7, for which they are operated with a reciprocal 120° phase shift. The cam 22 and the other drive elements of the pump 7 are housed in a sump 33. The shaft 23 is connected to the engine drive shaft 4 via a motion transmission device 26, with a 0.5 transmission ratio. Thus, during one revolution of the shaft 23, the cam 22 controls one pump cycle, comprising the intake and compression strokes of the three pistons 21, while the drive shaft 4 of the engine 2 performs two revolutions, during which the four injection events of the injectors 5 occur in the respective cylinders 3 of the engine 2.

In the fuel tank 11, the fuel is at atmospheric pressure. In use, the motor-driven pump 9 compresses the fuel to a low pressure, for example, of the order of just 2-3 bar. In turn, the high-pressure pump 7 compresses the fuel received from the intake line 10, common to the three pumping elements 18, as to send high-pressure fuel, for example in the order of 1600-1800 bar, through the delivery line 8, also common to the three pumping elements 18, to the common rail 6 of pressurized fuel.

In order to reduce the flow rate of the pump 7 when the operating conditions of the engine 2 require less fuel, this flow rate is normally controlled by a throttle device 31, comprising a metering solenoid valve 27, of the on-off type, positioned on the intake line 10. The outlet of solenoid valve 27 defines a segment 10' of the common line 10, this segment 10' is in communication with the three internal lines 28 of the intake valves 25. The solenoid valve 27 is controlled on the basis of the operating conditions of the engine 2, by the electronic control unit 16, which correspondingly controls the quantity of fuel taken by the injectors 5 and the pressure of this fuel in the common rail 6.

The throttle device 31 also comprises a pressure regulator 32 positioned upstream of the solenoid valve 27. The pressure regulator 32 is able to keep the supply pressure of the solenoid valve 27 at a constant level and send excess fuel in the line 10 to the sump 33, in order to lubricate its mechanisms. Fuel is then discharged from the sump 33 via the discharge line 12.

The control unit 16 is able to control the solenoid valve 27 via constant-frequency control signals, of which the duty-cycle is modulated (PWM pulse width modulation), or rather the duration of the signals, of which the interval between these signals also varies. Obviously, it is possible to control the solenoid valve 27, by modulating both the signal frequency and the related duty-cycle.

Control of the solenoid valve 27 defines an intake choking trough each intake valve 25 for a variable part of the intake stroke of the relevant piston 21. Choking can be achieved by varying the start and/or the end of the intake. In the example considered, the solenoid valve 27 is synchronously operated with the activation frequency of the pumping elements during the respective intake stroke of each piston 21 and consequently with a frequency three times that of the rotation of the shaft 23 of the pump 7. To this end, the control unit 16 receives the synchronization signals emitted by the sensor 34 of the phonic wheel 35 and emits frequency and/or duty-cycle modulated control signals. These signals can have a duration of the order of a thousandth of a second, while the duty-cycle can vary from 2% to 95%.

In practice, it should be noted that it is all but impossible that the timing signals defined by the control unit 16 exactly reproduce the position of the shaft 23 of the pump 7. One of the reasons for imprecision is due to the fact that the timing signals are digital, while those defined by the sensor 34 are derived from the analogue position of the phonic wheel 35 on the engine drive shaft 4.

Another reason for imprecision can derive from dividing the number of timing signals included in a revolution of the phonic wheel 35 by three. In fact, the quotient of this division is necessarily rounded, or truncated, by the control unit 16; for example, when it consists of a periodic number. The imprecision or timing error of the control unit 16 generates a certain forwards or backwards slippage of the instant of starting to open the solenoid valve 27 with respect to the instant, assumed as reference, in which the pumping element to be fed is at the top dead centre.

It has been experimentally observed that the slippage induced by the timing of the control unit 16, causes a certain irregular, but substantially periodic oscillation in the flow of the pump 7. This oscillation is shown as a function of time by curve G in the graph in FIG. 3. This curve is experimentally obtained with the engine 2 running at 5000 rpm and the pressure in the common rail set to 1200 bar. It should be noted that in FIG. 3, time is indicated in seconds on the abscissa, while the pressure of the fuel in the container 6 is indicated in bar on the ordinate. Since the shaft 23 of the pump 7 runs at 2500 rpm, the period of a wave in curve G is approximately 15 sec and encompasses approximately 600 revolutions of the shaft 23 and therefore approximately 1800 pumping actions. As previously explained, the lower the speed with which said slippage occurs, the greater will be the duration of this oscillation.

According to the invention, the control unit 16 is programmed in a manner to introduce a multiplication factor K other than 1 in the timing provided by the phonic wheel 35. In consequence, the control unit 16 controls the solenoid valve 27 with a frequency equal to that of the pumping actions multiplied by this K factor. Advantageously, this K factor can be between 0.90 and 1.10. Preferably, the K factor can be chosen to differ from the value 1 by being 0.01 greater or smaller.

Figure 3:
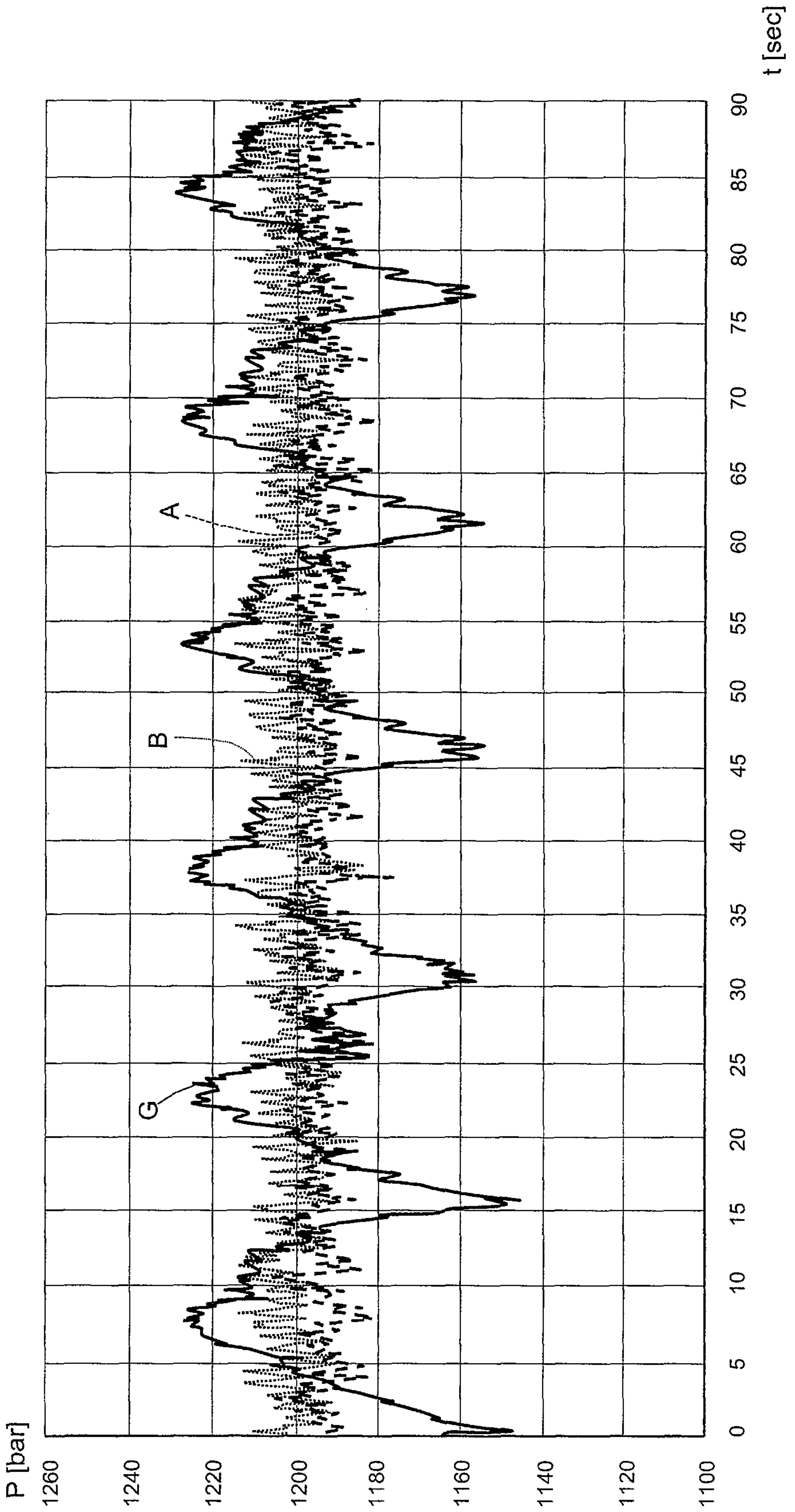
FIG. 3 is a graph of the operation of a fuel injection system, in which the pump is regulated according to the invention.

In FIG. 3, a curve A with a broken line is shown of the pressure oscillations in the common rail 6 in the case where the K factor is equal to 0.95, while the dotted line shows a curve B of the pressure oscillations in the common rail 6 in the case where the K factor is equal to 1.05. It results evident that in both cases the pressure oscillations have a much shorter period than that of pressure oscillations in the case of solenoid valve 27 operation synchronous with the stroke of the pumping elements, and much smaller amplitude. The period of the pressure oscillations in curves A and B is between 0.1 and 1.5 sec, while the amplitude of the pressure oscillations is between 10 and 30 bar, for which it is negligible for the purposes of controlling the flow of the pump 7.

The difference between the maximums and minimums of each curve A and B is due to the fact that at that instant, the solenoid valve 27 closes under different conditions in the phases of the pumping elements 18. In particular, the maximums occur when the solenoid valve 27 is opened at a moment in which there are two intake valves 25 open at the same time. At this moment, the "global" filling coefficient of the pump 7 is highest. In this case, the depression between the inlet and outlet of the solenoid valve 27 is highest and therefore the aspirated flow is greatest. Instead, the minimums of curves A and B occur when the solenoid valve 27 is opened at a moment in which there is only one intake valve 25 open. The depression between the inlet and outlet of the solenoid valve 27 is thus at a minimum.

The purpose of introducing the K factor is to ensure that the speed with which slippage occurs between the control signal to start activation of the solenoid valve 27 and the moment in which the related pumping element 18 is at top dead centre, is so high that the “global” filling coefficient of the pump 7 maintains a more or less constant value rather than continuously assuming values that run from the possible minimum to the maximum, related to the conditions of maximum and minimum pressure of curve G.

The solenoid valve 27 has a relatively small effective passage section, so as to allow fuel to be metered before it is compressed under high pressure by the pump 7. Advantageously, the passage section of the solenoid valve 27 is also such as to create an average flow rate during a predetermined time interval, a multiple of a preset unit of time, which can have the magnitude of the intake stroke duration of the pumping element 18.

Figure 2:
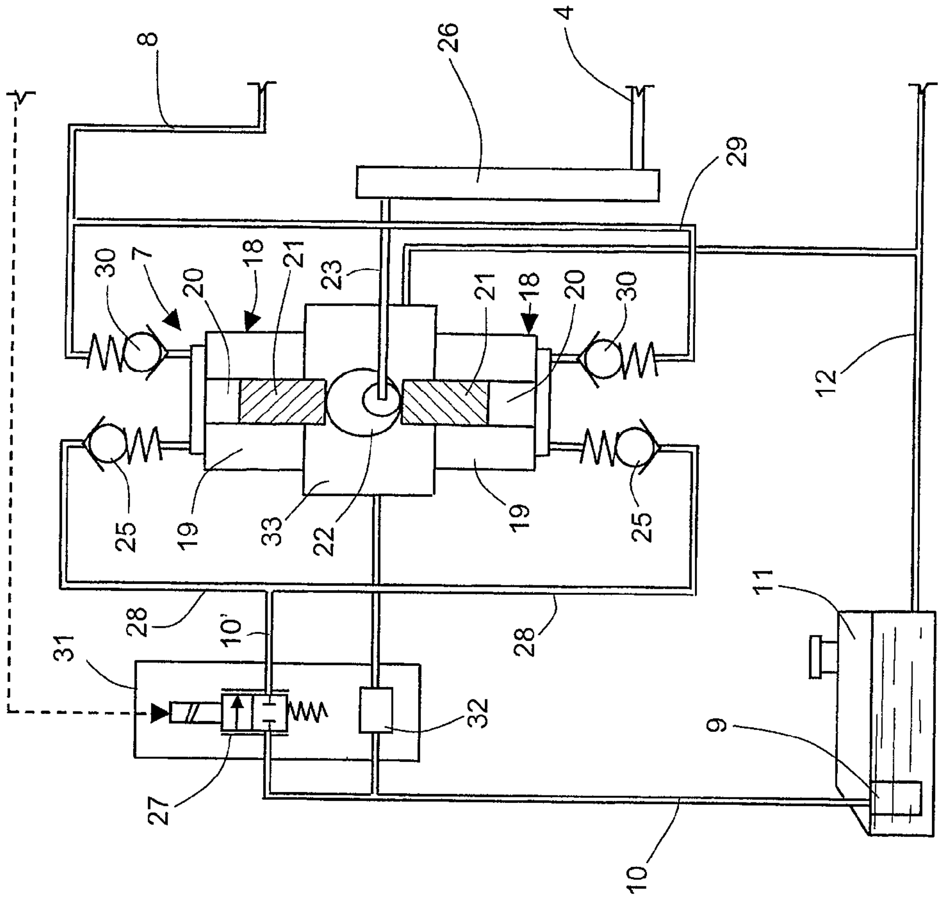
FIG. 2 is a diagram of a fuel injection system, with another type of high-pressure pump.

In the embodiment in FIG. 2, two opposing pumping elements 18 driven by a common cam are provided. The parts corresponding to those of the embodiment in FIG. 1 are indicated with the same reference numeral, for which the description is not repeated. Here as well, the solenoid valve 27 is common to the two pumping elements 18 and the fuel sent through the intake line 10 to the pump 7 is aspirated each time through the associated intake valve 25 of just pumping element 18, that is performing the intake stroke at that moment. The intake valve 25 of the other pumping element 18 is normally closed, as it is in the compression phase.

However, as in the case of the pump with three pumping elements shown in FIG. 1, in the case of flow rate choking, it can happen that the intake valves 25 are open at the same time. In fact, in the compression phase of the pumping element 18 for example, there is a considerable vapour fraction, as the pump works in choked conditions. Thus, the respective intake valve 25 also remains open due to the effect of the pressure exerted on it by the fuel contained in the line 28.

Also in the case of the pump 7 with two pumping elements 18, in which the solenoid valve 27 is controlled in a synchronous manner with the intake strokes of the pumping elements 18, the “global” filling coefficient of the pump 7 is heavily influenced by the phase shift between the instant at which opening of the solenoid valve 27 takes place and the instant in which the respective pumping element 18 is at top dead centre, assumed as reference. For example, the “global” filling coefficient could be highest if the solenoid valve 27 is opened when both the intake valves 25 are open at the same time. Instead, this filling coefficient is lowest when opening is operated in correspondence to a pumping element 18 in the discharge phase (consequently with the intake valve 25 closed), while the other pumping element 18 finds itself under conditions in which the resistance of the spring of the intake valve 25 is greatest and the depression created by the pumping element 18 is least (or rather at the beginning of aspiration).

From what has been seen above, the advantages of the injection system, having a metering solenoid valve 27 for fuel aspiration operated according to the invention variable, with respect to known art, are evident. In particular, fuel rate metering can be advantageously accomplished by the solenoid valve 27 on fuel at low pressure, rather than by the pumping elements 18. With the control of the solenoid valve 27 not perfectly synchronized with the intake stroke of the pumping elements 18, it is possible to avoid the intense pressure oscillations in the common rail 6 due to the slow slippage between the instant of the command to start activation of the metering solenoid valve 27 and the instant in which the pumping element 18 is at the top dead centre, assumed as reference. This slippage can be produced by the inevitable synchronization errors between the signals of the phonic wheel 35 and the timing calculated or produced by the control unit 16.

It is understood that various modifications and refinements can be made to the above-described injection system with a high-pressure pump without departing from the scope of the claims. For example, in the case of systems in which the solenoid valve 27 is operated synchronously with the cycle of the pump 7, in the case of pumps with three pumping elements, the solenoid valve 27 operates once every three intake strokes, or rather once per revolution of the shaft 23 of the pump 7. The frequency with which to operate the solenoid valve 27 to avoid slippage that is too slow shall be given by the K factor multiplied by the rotational frequency of the shaft 23. In this case, K shall still be between 0.90 and 1.10 and chosen so as to differ from the value 1 by being at least 0.01 greater or smaller.

The same is also applicable in the case where the solenoid valve 27 is operated with a frequency equal to a whole multiple of the frequency with which an intake stroke of each pumping element 18 occurs or with the cycle frequency of the pump 7. In some embodiments, the whole mulitple is 1. A factor K is then introduced, such that by multiplying the operation frequency of the solenoid valve 27 by this K factor, it is possible to avoid having slow slippage and therefore wide pressure oscillations in the common rail. Furthermore, the solenoid valve 27 can be operated with a frequency equal to a whole submultiple of the frequency of the intake stroke of each pumping element 18, or with a frequency equal to a whole submultiple of the cycle frequency of the pump 7. In these cases as well, the value of K is between 0.90 and 1.10 and chosen so as to differ from the value 1 by being at least 0.01 greater or smaller.

Lastly, the phonic wheel 35 can be placed directly on the shaft 23, or the motion transmission device 26 can be eliminated and the shaft 23 of the high-pressure pump 7 operated at a speed independent of that of the engine drive shaft 4. Even the fuel discharge solenoid valve 15 of the common rail 6 could be eliminated.

The invention claimed is:

1. A fuel injection system for an internal combustion engine, comprising:

a variable flow rate high-pressure pump having at least one pumping element operable to perform intake and discharge strokes in a reciprocating manner, at an activation frequency that is based on engine revolutions speed, said pumping element having an intake valve in fluid communication with an intake line and a delivery valve in fluid communication with a delivery line;

a throttle device to control a flow rate of the pump including a metering solenoid valve positioned on said intake line to meter the quantity of fuel supplied to said pumping element; and a control unit in electronic communication with said solenoid valve, the control unit programmed to calculate a number equal to a whole multiple or submultiple of the activation frequency of said pumping element that is multiplied by a factor other than 1, the factor being between 0.90 and 1.10, inclusive. the control unit transmitting a signal to operate said solenoid valve at a frequency equal to the calculated number, during the intake stroke of said pumping element.

2. The fuel injection system according to claim 1 wherein said high-pressure pump includes two or more pumping elements operated in sequence during a pump cycle, said pump being operated with a preset pump frequency, wherein the calculation is equal to a whole multiple or submultiple of the activation frequency of the pump multiplied by the factor.

3. The fuel injection system according to claim 1, wherein said whole multiple is 1.

4. The fuel injection system according to claim 1, wherein said factor is at least 0.01 greater or smaller than 1.

5. The fuel injection system according to claim 1, wherein said high-pressure pump includes two or more pumping elements operated by a rotating shaft synchronized with a drive shaft of said engine, said intake line being common to said pumping elements and said solenoid valve being positioned on said intake line.

6. The fuel injection system according to claim 5, wherein said high-pressure pump comprises two pumping elements operated in phase opposition.

7. The fuel injection system according to claim 5, wherein said high-pressure pump includes three pumping elements operated with 120° phase shift from one another.

8. The fuel injection system according to claim 1, wherein during operation of the fuel injection system, said control unit controls said solenoid valve based on the pressure of the fuel detected by a corresponding pressure sensor in an accumulation volume of high-pressure fuel.

9. The fuel injection system according to claim 1, wherein during operation of the fuel injection system, said control unit controls said solenoid valve via frequency and/or duty-cycle modulated control signals.

10. The fuel injection system according to claim 9, wherein during operation of the fuel injection system, said control unit controls said solenoid valve via control signals of constant duration and emitted with variable frequency.

11. The fuel injection system according to claim 9, wherein during operation of the fuel injection system, said control unit controls said solenoid valve via control signals with frequency correlated to the speed of rotation of said pump and/or with variable duty-cycle.

12. The fuel injection system according to claim 8, wherein the duration of each control signal is of the order of a thousandth of a second and/or said duty-cycle varies from 2% to 95%.

13. The fuel injection system according to claim 1, wherein said high-pressure pump includes a sump in which pump drive mechanisms are housed, and said throttle device includes a pressure regulator positioned in parallel to said metering solenoid valve, configured to maintain pressure upstream of said solenoid valve constant and to send excess fuel to said sump to cool and lubricate said mechanisms.

14. A fuel injection system for an internal combustion engine, comprising:

a variable flow rate high-pressure pump having at least one pumping element operated in a reciprocating manner including intake and discharge strokes, said pumping element having an intake valve in fluid communication with an intake line and a delivery valve in fluid communication with a delivery line;

a throttle device operatively coupled to the pump to control a flow rate thereof, the throttle device including a metering solenoid valve positioned on said intake line to meter the quantity of fuel fed to said pumping element; and a control unit electrically coupled to said solenoid valve, the control unit configured to calculate a value equal to a whole multiple or submultiple of an activation frequency of said pumping element per a cycle of the engine multiplied by a factor other than one, the factor being between 0.90 and 1.10, inclusive. and to output a signal to control said solenoid valve, at a frequency equal to the calculated value per the cycle of the engine, during the intake phase of said pumping element.

* * * * *